United States Patent [19]
Fujita et al.

[11] Patent Number: 5,469,512
[45] Date of Patent: Nov. 21, 1995

[54] PATTERN RECOGNITION DEVICE

[75] Inventors: Masahiro Fujita, Saitama; Shigeru Arisawa, Tokyo, both of Japan

[73] Assignee: Sony Corporation, Tokyo, Japan

[21] Appl. No.: 117,494

[22] Filed: Sep. 7, 1993

[30] Foreign Application Priority Data

Sep. 8, 1992 [JP] Japan .................. 4-265506

[51] Int. Cl.$^6$ .................................. G06K 9/00
[52] U.S. Cl. ........................... 382/118; 382/159
[58] Field of Search ..................... 382/2, 14, 15

[56] References Cited

U.S. PATENT DOCUMENTS

| | | | |
|---|---|---|---|
| 3,333,248 | 7/1967 | Greenberg et al. | 382/15 |
| 3,805,238 | 4/1974 | Rothfjell | 382/2 |
| 4,451,929 | 5/1984 | Yoshida | 382/15 |
| 4,651,289 | 3/1987 | Maeda et al. | 382/15 |
| 4,841,575 | 6/1989 | Welsh et al. | 382/2 |
| 5,163,094 | 11/1992 | Prokoski et al. | 382/2 |
| 5,164,992 | 11/1992 | Turk et al. | 382/2 |

FOREIGN PATENT DOCUMENTS

| | | | |
|---|---|---|---|
| 2231699 | 11/1990 | United Kingdom | 382/2 |
| 9202000 | 2/1992 | WIPO . | |

OTHER PUBLICATIONS

Patent Abstracts of Japan, vol. 14, No. 238 (P–1050), 21 May 1990 & JP–A–02 059 883 (NEC Corp), 28 Feb. 1990.
Patent Abstracts of Japan, vol. 16, No. 559 (P–1455), 30 Nov. 1992 & JP–A–04 213 172 (Nippon Telegr & Teleph Corp), 4 Aug. 1992.
Patent Abstracts of Japan, vol. 16, No. 348 (P–1393), 28 Jul. 1992 & JP–A–04 106 674 (Enu Tei Deeta Tsuushin), 8 Apr. 1992.
Jeanne McDermott: "Face to Face, It's the Expression that Bears the Message." Smithsonian, vol. 16, No. 12, pp. 112–113, Mar. 1986.
Masahide Kaneko, Atsushi Koike and and Yoshinori Hatori: "Treatment of Luminance/Chrominance and Motion Information Applied to 3–D Model–based Coding of Moving Facial Images." Journal of Institute of Television, vol. 56, No. 10, pp. 1277–1287, 1991.
Matthew Turk and Alex Pentland; "Eigenfaces for Recognition." Journal of Cognitive Neuroscience, vol. 3, No. 1, pp. 71–86, 1991.
Susan E. Brennan: "Caricature Generator: The Dynamic Exaggeration of Faces by Computer." Leonardo, vol. 18, No. 3, pp. 170–178, 1985.

*Primary Examiner*—Leo H. Boudreau
*Attorney, Agent, or Firm*—Limbach & Limbach; Philip M. Shaw, Jr.

[57] ABSTRACT

The recognition pattern device is intended to improve the recognition ratio. In a pre-processing unit 3, an input pattern is prepared based on the image taken from a video camera 1. Then, in a comparing processing unit 4, the input pattern is compared with a basic pattern stored in a function learning storing unit, and the deformed amount of the input pattern to the basic pattern is calculated. Thus, in a deformed amount analysis unit, the deformed amount is analyzed. Finally, in a person's information learning storing unit, on the basis of the above result, the standard pattern stored therein is regenerated.

6 Claims, 10 Drawing Sheets

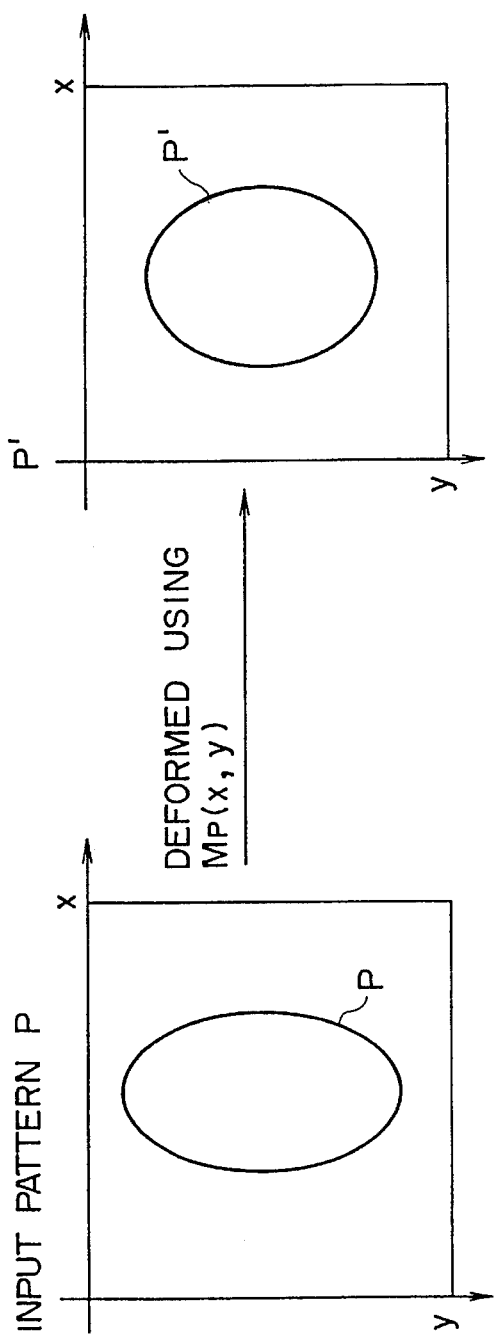
F I G. 5(a)
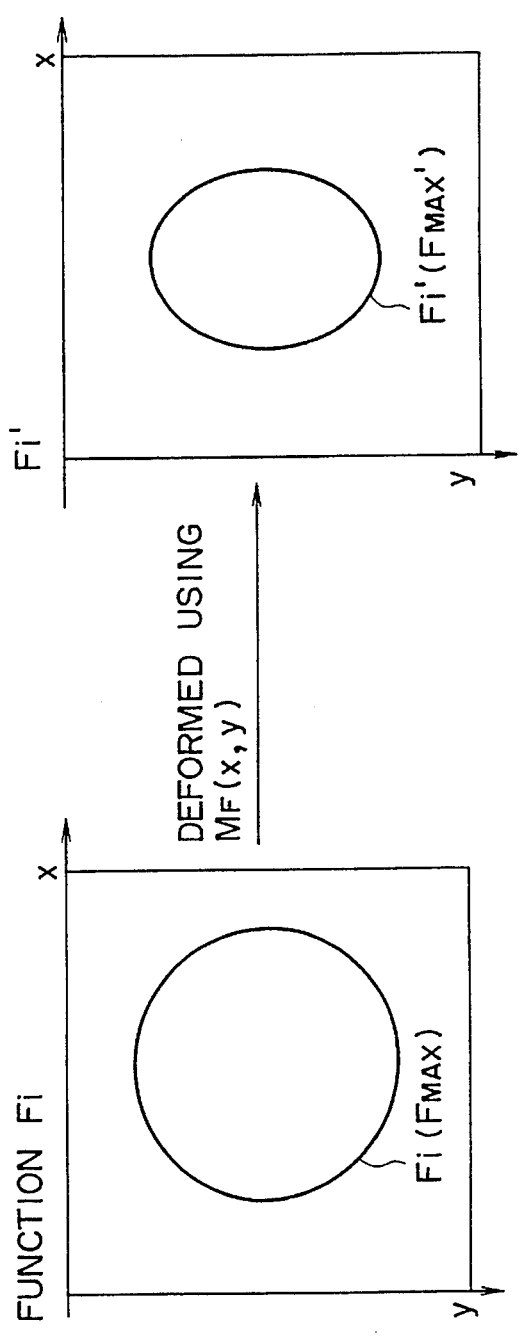
F I G. 5(b)

PATTERN RECOGNITION DEVICE

BACKGROUND OF THE INVENTION

1. Field of the Invention

The present invention relates to a pattern recognition device suitable for image recognition or the like.

2. Description of the Related Art

FIG. 8 is a block diagram showing the construction of one example of prior art image recognition devices. A luminance level I (x, y) on the xy plane as an image data, for example, a person's face image photographed by a video camera (not shown) or the like is inputted in a pre-processing unit 21. In the pre-processing unit 21, the characteristic amount of the image data I (x, y), for example, an image edge P (x, y) is detected, and is outputted to an analysis unit 22.

The analysis unit 22 performs a main component analysis or the like for the characteristic amount P (x, y) of the person's image outputted from the pre-processing unit 21. It calculates a contribution degree $X_i$ of the characteristic amount P (x, y) of the person's image, for example, to each of functions $F_i$ (x, y) (i=1, 2, . . . , r) of r pieces previously stored in a function storing unit 23, and outputs it to a pattern classifying unit 24.

The pattern classifying unit 24, when the device is in a learning mode, stores the contribution degree $X_i$ of the characteristic amount P (x, y) of the person's image outputted by the analysis unit 22 in a memory (not shown) contained therein, in correspondence to the person information K (t) being the function of, for example, the number t given to the person (t=1, 2, . . . , T: T is the number of the person's faces) as the recognition result. In this case, for example, an average value of a plurality of contribution degrees $X_i$, $X_i'$, $X_i''$, $X_i'''$, . . . for the image of the same person t is taken as the person information K (t).

The pattern classifying unit 24, when the device is in a recognition mode, calculates the Euclidean distance between the contribution degree $X_i$ of the characteristic amount P (x, y) of the person's image outputted from the analysis unit 22, and a known person's information K (t) previously stored in the memory contained therein. It outputs the number t in the person's information K (t) of minimizing the distances as the recognition result.

The recognition of the person's face image is thus performed.

As the method of recognizing a person's face, there has been known a technique using an image compression method called Model-Based Coding ["Treatment of Luminance/Chrominance and Motion Information Applied to 3-D Model-based Coding of Moving Facial Images": Journal of Institute of Television, Vol. 45, No. 10. p1277–1287 (1991)]. Further, related techniques have been disclosed in the following documents: ["Eigenfaces for Recognition": Journal of Cognitive Neuroscience Vol. 3, No. 1 P.71–86 (1991)] [CARICATURE GENERATOR: THE DYNAMICS EXAGGERATION OF FACES BY COMPUTER. Susan E. Brennan in Leonardo, Vol. 18, No. 3, pages 170–178; 1985], and [FACE TO FACE: ITS THE EXPRESSION THAT BEARS THE MESSAGE. Jeanne McDermott in Smithsonian, Vol. 16, No. 12, pages 112–123; March, 1986]. In the Model-Based Coding, on the coding side, as shown in FIG. 9, the so-called wire frame model is made to correspond to the person's face inputted, and the difference information (characteristics of the person's face to the model) is taken out and transmitted. On the other hand, on the decoding side, the same model as used on the coding side is deformed on the basis of the above difference information, to reproduce the person's face.

Accordingly, in recognition of the person's face using the Model-Based-Coding, the difference information between the inputted image of the person's face (FIG. 10a) and the model (FIG. 10b) is first taken.

Namely, the person's face image (FIG. 10a) photographed by a video camera is inputted, for example, in a computer and is displayed on a CRT. Then, the positions of the person's face image displayed on the CRT (indicated at X marks in FIG. 10c) in correspondence to specified positions previously set on the wire frame model (FIG. 10b), for example, eyes, both ends of a mouth and the like (indicated at X-marks in FIG. 10b) are designated, for example, by positioning a mouse controlled cursor and "clicking" with the mouse. The wire frame model is deformed as shown in FIG. 10d such that the positions (FIG. 10c) designated on the the person's face image are overlapped on the specified positions (FIG. 10b) previously set on the wire frame model. Thus, the deformed amount is taken out as the difference information.

This difference information thus taken out is made to correspond to the person's information, which is stored in a memory contained in the computer as the recognition information for that person, i.e. as the identity information.

In recognizing a person's face, the recognition information most analogous to the difference information obtained from the inputted image of the person's face is detected, and the personal identity information in correspondence to the recognition information is outputted as the recognition result.

However, in the image recognition described above, since the person's face is photographed by a video camera, there is a tendency that a vertical or horizontal deviation and a tilting are generated on the screen, and further, the magnitudes thereof are different from each other.

Accordingly, in this case, for example, in the analysis unit 22 of FIG. 8, not only the information on the person's face image, but also the information on the vertical or horizontal deviation and the positional deviation due to rotation with respect to the person's face image on the screen, and further the deviation in magnitude due to the enlargement/reduction ratio of a video camera, that is, the unnecessary information is subjected to the main component analysis. This brings about such a disadvantage as to deteriorate the recognition ratio.

Further, the model as shown in FIG. 10b must be prepared for each recognition object. Namely, for recognition of the person's face, the person's face model must be prepared, and for recognition of the person's hand, the person's hand model must be prepared. Additionally, for example, in the case that all the models are prepared and stored, a lot of memories must be prepared, thus causing a disadvantage of enlarging the size of the device.

On the other hand, in recognition of the person's face using the Model-Based Coding described above, the positions of the person's face image displayed on the CRT (indicated at X-marks in FIG. 10c) must be manually selected with a mouse, which brings about an inconvenience.

SUMMARY OF THE INVENTION

In view of the above situations, the present invention has been made, and an object of the present invention is to miniaturize the device and to improve the recognition ratio.

A pattern recognition device defined in claim 1 comprises: a function learning storing unit 5 as a basic pattern storing means for storing a basic pattern such as a function $F_i$; a pre-processing unit 3 as a preparing means for preparing an input pattern P (x, y) from the inputted information such as an image data I (x, y); a comparing processing unit 4 as a comparing means for comparing the input pattern P (x, y) prepared by the pre-processing unit 3 with the basic pattern $F_i$ (x, y) stored in the function learning storing unit 5, and for calculating a deformed amount M (x, y) of the input pattern (x,y) to the basic pattern $F_i$ (x, y); a program processing step S14 as a deforming means for deforming the basic pattern $F_i$ (x, y) stored in the function learning storing unit 5 or the input pattern P (x, y) prepared by the pre-processing unit 3 on the basis of the deformed amount M (x, y) outputted from the comparing processing unit 4; and a program processing step S15 as a basic pattern regenerating means for regenerating the basic pattern $F_i$ (x, y) stored in the function learning storing unit 5 on the basis of the basic pattern $F_i$ (x, y) and the input pattern P (x, y) deformed by the program processing step S14.

A pattern recognition device defined in claim 2 comprises: a function learning storing unit 5 as a basic pattern storing means for storing a basic pattern such as a function $F_i$ (x, y); a person's information learning storing unit 7 as a standard pattern storing means for storing a standard pattern; a pre-processing unit 3 as a preparing means for preparing an input pattern P (x, y) from the inputted information such as an image data I (x, y); a comparing processing unit 4 as a comparing means for comparing the input pattern P (x, y) prepared by the pre-processing unit 3 with a basic pattern $F_i$ (x, y) stored in the function learning storing unit 5, and for calculating at least a deformed amount M (x, y) of the input pattern P (x, y) to the basic pattern $F_i$ (x, y) and, for example, a correlation amount such as a contribution ratio $X_i$; a deformed amount analysis unit 6 as an analyzing means for analyzing the deformed amount M (x, y) calculated by the comparing processing unit 4; and a program processing steps S31 to S35 as a standard pattern regenerating means for regenerating a standard pattern stored in the person's information learning storing unit 7 on the basis of at least an analysis result Mtdr (x, y) from the deformed amount analysis unit 6 among the analysis result Mtdr (x, y) and the contribution ratio $X_i$ calculated by the comparing processing unit 4.

In a pattern recognition device defined in claims 3 and 4, the pre-processing unit 3 filters the image data I (x, y) with a LOG (Laplacian Of Gaussian) filter, to detect the zero crossing point, and filters it with a low pass filter.

In a pattern recognition device defined in claim 5, the program processing step S15 deforms the basic pattern $F_{MAX}$ (x, y), of giving the maximum contribution degree $X_{MAX}$ in the contribution degree Xi of the input pattern P (x, y), to the basic pattern $F_i$ (x, y).

In a pattern recognition device defined in claims 6 and 7, the comparing processing unit 4 matches the input pattern P (x, y) with the basic pattern $F_i$ (x, y) for each block, and calculates the movement amount of the block as the deformed amount M (x, y).

In a pattern recognition device, preferably, the person's information learning storing unit 7 is constituted of a neural network.

In a pattern recognition device, preferably, the program processing steps S31 to S35 regenerates the weighting factor of the neural network in the person's information learning storing unit 7 on the basis of an error inverse propagation method.

In a pattern recognition device defined in claims 8 and 9, the pre-processing unit 3 prepares the input pattern I (x, y) on the basis of the face image.

In the pattern recognition device according to the present invention, an input pattern P (x, y) is prepared on the basis of an image data I (x, y). The input pattern P (x, y) is compared with a basic pattern $F_i$ (x, y) stored in a function learning storing unit 5, to calculate a deformed amount M (x, y) of the input pattern P (x, y) to the basic pattern $F_i$ (x, y).

On the basis of the deformed amount M (x, y), the basic pattern $F_i$ (x, y) stored in the function learning storing unit 5 or the input pattern P (x, y) prepared by the pre-processing unit 3 is deformed. Thus, the basic pattern $F_i$ (x, y) stored in the function learning storing unit 5 is regenerated on the basis of the deformed basic pattern $F_i$ (x, y) and the input pattern P (x, y). Accordingly, since the basic pattern $F_i$ (x, y) is regenerated so as to be analogous to the input pattern P (x, y), the basic pattern $F_i$ (x, y) is not required to be prepared for each recognition object. This makes it possible to reduce the memory capacity of the function learning storing unit 5 for storing the basic pattern $F_i$ (x, y), and hence to make small the size of the device. Further, the recognition ratio can be improved.

Additionally, in the pattern recognition device of the present invention, the input pattern P (x, y) is compared with the basic pattern $F_i$ (x, y) stored in the function learning storing unit 5, to calculate the deformed amount M (x, y) of the input pattern P (x, y) to the basic pattern $F_i$ (x, y). The deformed amount M (x, y) is then analyzed, and the parallel movement component, rotational movement component and the enlargement/reduction component of the input pattern P (x, y) contained in the deformed amount M (x, y) are removed. Thus, on the basis of a new deformed amount Mtdr (x, y), a standard pattern stored in the person's information learning storing unit 7 is regenerated. Accordingly, it is possible to improve the recognition ratio.

BRIEF DESCRIPTION OF THE DRAWINGS

FIGS. 5(*a*) and 5(*b*) are a view showing an input pattern P (x, y) and a function $F_i$ (x, y) deformed in the function learning storing unit in FIG. 1;

DETAILED DESCRIPTION OF THE PREFERRED EMBODIMENTS

Hereinafter, embodiments of the present invention will be described in detail with reference to the drawings.

Figure 1:
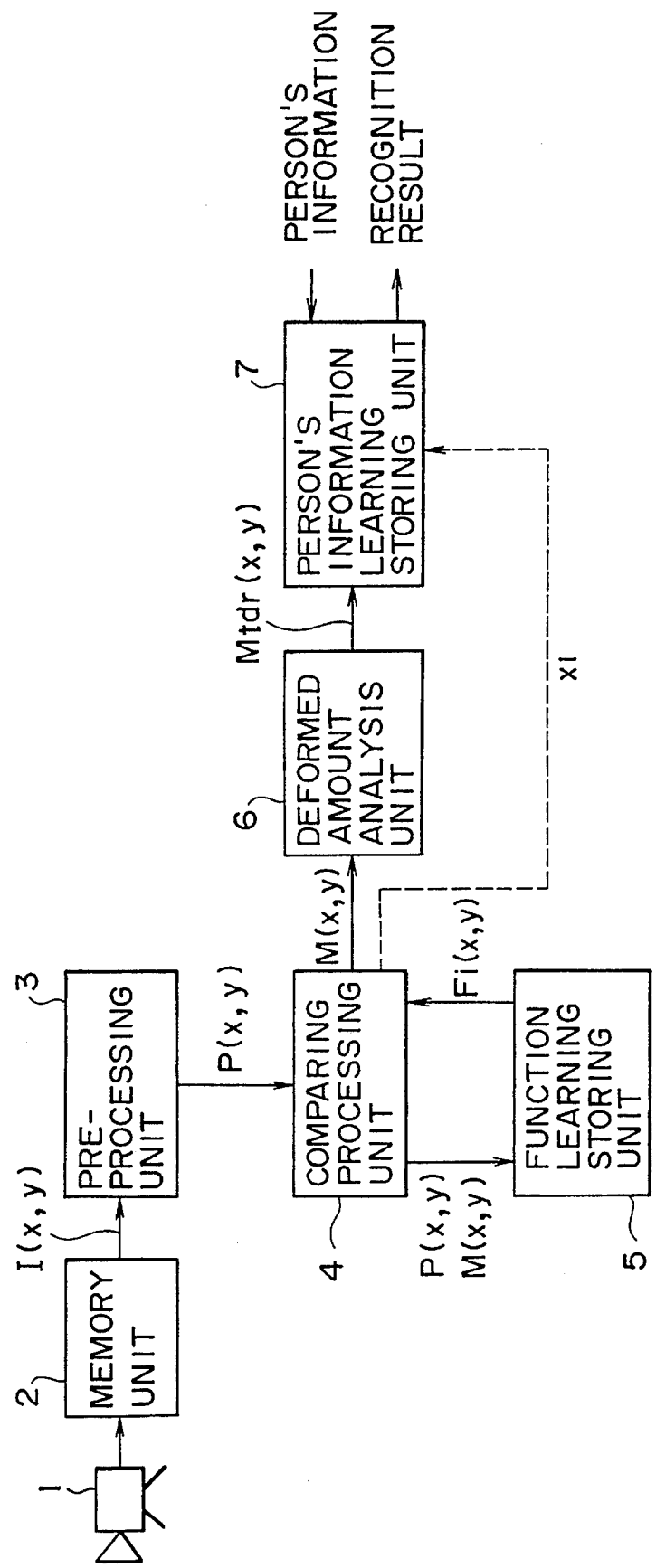
FIG. 1 is a block diagram showing the construction of one embodiment of image recognition apparatuses to which a pattern recognition device of the present invention is applied.

FIG. 1 is a block diagram showing the construction of one embodiment of image recognition apparatuses to which a pattern recognition device of the present invention is applied. A video camera 1 has a CCD, which converts a light used for photographing a person's face or the like into a face image signal as an electric signal. A memory unit 2 is constituted of an RAM and an A/D converter (not shown), which quantizes the face image signal outputted from the video camera 1, for example, in eight bits by means of the A/D converter, and temporarily stores digital signals (face image data) such as two-dimensional luminance information I (x, y) on the xy plane in the RAM for each frame.

A pre-processing unit 3 performs, for example, the edge detection for the face image signal I (x, y) stored in the memory unit 2, and takes out an input pattern P (x, y) as the characteristic amount of the face image [face image data I (x, y)], and outputs it into a comparing processing unit 4.

The comparing processing unit 4 calculates the basic model of the characteristic amount P (x, y) of the face image data I (x, y) stored in a function learning storing unit 5, for example, a contribution degree $X_i$ as a correlation amount of the input pattern P (x, y) of the face image data I (x, y) outputted from the pre-processing unit 3, for example, to each of functions $F_i$ (x, y) (i=1, 2, 3 ..., r) of r pieces. The unit 4 detects the maximum contribution degree $X_{MAX}$ as the maximum value in the contribution degree $X_i$, and further, calculates a deformed amount M (x, y) as the difference information between a function $F_{MAX}$ (x, y) of giving the maximum contribution degree $X_{MAX}$ (MAX is one of the numbers of 1 to r) and the input pattern P (x, y). It supplies the deformed amount M (x, y) to the function learning storing unit 5 and a deformed analysis unit 6.

The function learning storing unit 5 is constituted of, for example, a neural network. It stores the functions $F_i$ (x, y) (i=1, 2, 3 ..., r) of r pieces as the basic model of the characteristic amount P (x, y) of the face image data I (x, y).

Further, the function learning storing unit 5 deforms either the function $F_{MAX}$ (x, y), of giving the maximum contribution degree $X_{MAX}$ detected by the comparing processing unit 4, or the inputted pattern P (x, y) using the deformed amount M (x, y) calculated in the comparing processing unit 4. Thus, as a function of the deformed function $F_{MAX}'$ and the deformed input pattern P' (x, y) on the xy plane, the unit 5 regenerates the function $F_{MAX}$ (x, y) stored therein.

The deformed amount analysis unit 6 analyzes the deformed amount M (x, y) calculated by the comparing processing unit 4. Thus, the unit 6 removes the components of the person's face image taken by the video camera 1 as the input pattern P (x, y) with respect to the vertical or horizontal deviation on the screen and the positional deviation due to rotation or the difference in magnitude due to the enlargement/reduction ratio of the video camera 1, which are contained in the deformed amount M (x, y). It outputs a new deformed amount Mtdr (x, y) to a person's information learning storing unit 7.

The person's information learning storing unit 7, when the device is in a learning mode, stores the new deformed amount Mtdr (x, y) outputted from the deformed amount analysis unit 6 in a memory (not shown) contained therein in correspondence to the person's information K (t) being the function of the number t given to the person (face) (t=1, 2, ..., T: where T is the number of the images of a person's face) as the recognition result. In this case, for example, an average value of a plurality of the deformed amounts Mtdr (x, y), Mtdr'(x, y), Mtdr''(x, y), Mtdr''' (x, y), ... in the face image of the same person t is taken as the person information K (t).

Namely, the person's information learning storing unit 7, when the device is in the learning mode, stores the deformed amount Mtdr (x, y) itself of a person t outputted from the deformed amount analysis unit 6 as the person's information. Further, each time the deformed amount Mtdr (x, y) of the same person t is inputted, the unit 7 regenerates the person's information K (t) on the basis of the deformed amount Mtdr (x, y).

Further, the person's information learning storing unit 7, when the device is in a recognition mode, calculates the Euclidean distance between the deformed amount Mtdr (x, y) outputted from the deformed amount analysis unit 6, and certain person information K (t) previously stored in the memory contained therein, and outputs the number t in the person's information K (t), thereby of minimizing the distances as the recognition result.

The operation of the pattern recognition device of the present invention will be described below. When the device is in the learning mode, in the video camera 1, the light used for photographing a person's face or the like is converted into a face image signal as an electric signal, and is outputted into a memory unit 2. In the memory unit 2, the face image signal (analog signal) outputted from the video camera 1 is quantized, for example, in eight bits in an A/D converter contained therein, and the two-dimensional luminance information I (x, y) on the xy plane as digital signals (face image data) is temporarily stored in an RAM contained therein for each frame.

In the pre-processing unit 3, the face image data I (x, y) stored in the memory unit 2 is read out, edge detection or the like being performed, and an input pattern P (x, y) as the characteristic amount of the face image [face image data I (x, y)] is taken out.

Figure 2:
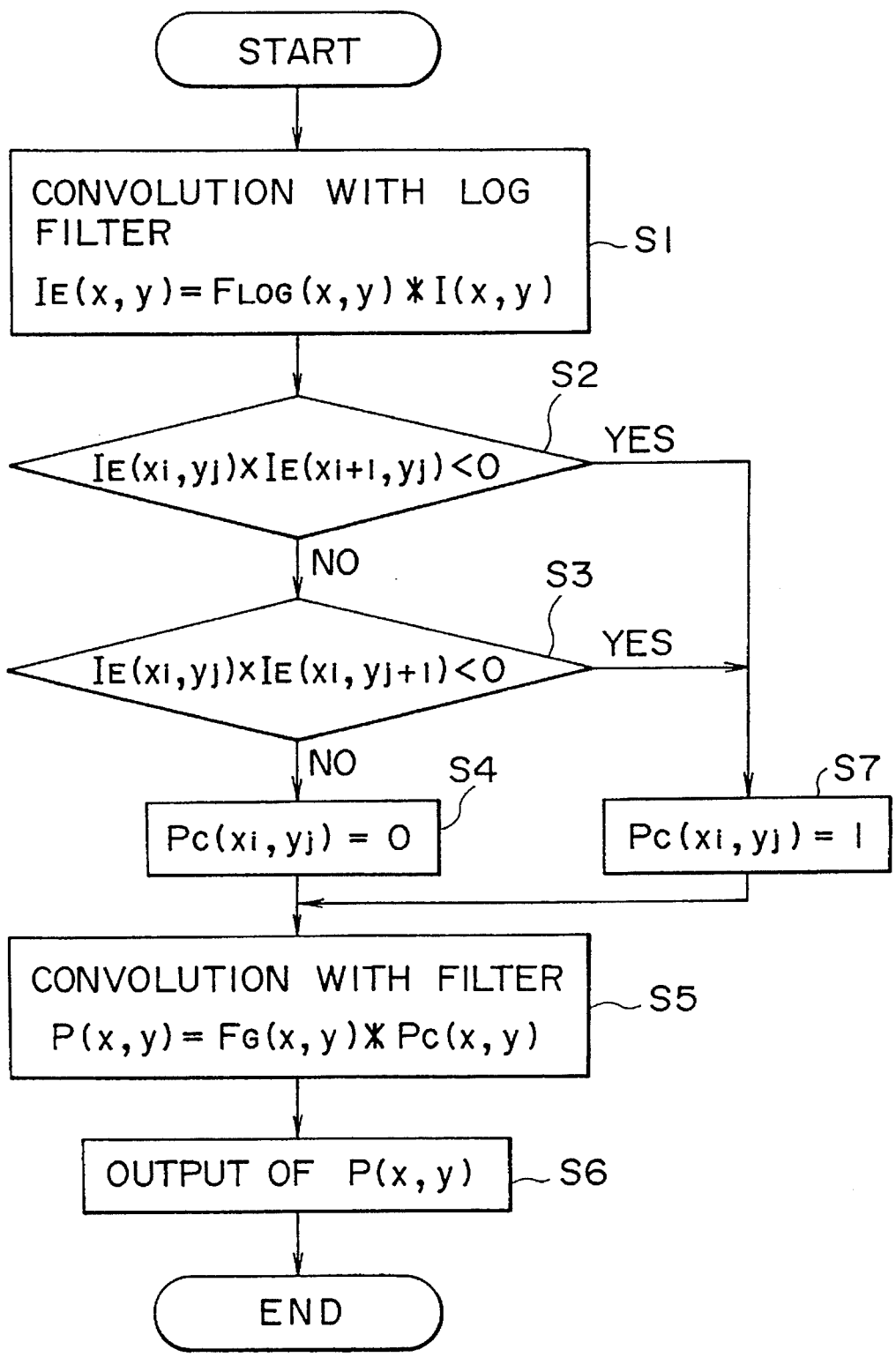
FIG. 2 is a flow chart for explaining the action of a pre-processing unit 3 of the embodiment in FIG. 1.

Namely, in the pre-processing unit 3, as shown in the flow chart of FIG. 2, first, in a step S1, the face image data I (x, y) is filtered with a LOG (laplacian Of Gaussian) filter, to take out the edge portion of the face image, and an edge signal $I_E$ (x, y) is thus calculated (the edge is detected).

Additionally, in the step S1, the edge signal $I_E$ (x, y) may be acquired by multiplying the frequency characteristic of the face image data I (x, y) by the frequency characteristic of the LOG filter. However, in this embodiment, the edge signal $I_E$ (x, y) is acquired by two-dimensionally convoluting the face image data I (x, y) with an impulse response $F_{LOG}$ (x, y) as shown in the equation of (1-1):

$$F_{LOG}(x,y) = \frac{-1}{\pi\sigma^2} \left( 1 - \frac{x^2 + y^2}{2\sigma^2} \right) \exp\left( -\frac{x^2 + y^2}{2\sigma^2} \right) \quad (1\text{-}1)$$

In addition, σ is a specified constant set according to the magnitude of the LOG filter.

The process advances to a step 2, wherein it is judged whether or not the product of an edge signal $I_E$ ($x_i$, $y_j$) at a point ($x_i$, $y_j$) and an edge signal $I_E$ ($x_{i+1}$, $y_j$) at a point ($x_{i+1}$, $y_j$) moved from the point ($x_i$, $y_j$) in the x-direction by one picture element is negative within a screen of the face image outputted from the video camera 1, that is, within the range of Xo≦$x_i$≦X1, Yo≦$y_j$≦Y1 on the xy plane.

Here, briefly, it is assumed that the face image outputted from the video camera 1 to the pre-processing unit 3 through the memory unit 2 is constituted of the picture elements of N pieces for each of the vertical and horizontal directions. Further, the point (Xo, Yo) on the xy plane is taken as the origin (0, 0). Accordingly, it is assumed that X1=Y1=N−1.

In the step S2, if the product of an edge signal $I_E$ ($x_i$, $y_j$) at a point ($x_i$, $y_j$) and an edge signal $I_E$ ($x_{i+1}$, $y_j$) at a point ($x_{i+1}$, $y_j$) moved from the point ($x_i$, $y_j$) in the x-direction by one picture element is judged to be negative, that is, if the code of the edge signal $I_E$ ($x_i$, $y_j$) at a point ($x_i$, $y_j$) is different from the code of the edge signal $I_E$ ($x_{i+1}$, $y_j$) at a point ($x_{i+1}$, $y_j$) moved from the point ($x_i$, $y_j$) in the x-direction by one picture element, the process advances to a step S7, wherein it is judged that the zero crossing is generated between the point ($x_i$, $y_j$) and the point ($x_{i+1}$, $y_j$). Thus, the value of 1 which designates the generation of the zero crossing is, for example, set in a zero crossing function $P_c$ ($x_i$, $y_j$), and the process advances to a step S5.

In the step S2, if the product of the edge signal $I_E$ ($x_i$, $y_j$) at the point ($x_i$, $y_j$) and the edge signal $I_E$ ($x_{i+1}$, $y_j$) at the point ($x_{i+1}$, $y_j$) moved from the point ($x_i$, $y_j$) in the x-direction by one picture element is judged not to be negative, the process advances to a step S3, wherein it is judged whether or not the product of an edge signal $I_E$ ($x_i$, $y_j$) at a point ($x_i$, $y_j$) and an edge signal $I_E$ ($x_i$, $y_{j+1}$) at a point ($x_i$, $y_{j+1}$) moved from the point ($x_i$, $y_j$) in the y-direction by one picture element is negative.

In the step S3, if the product of an edge signal $I_E$ ($x_i$, $y_j$) at a point ($x_i$, $y_j$) and an edge signal $I_E$ ($x_i$, $y_{j+1}$) at a point ($x_i$, $y_{j+1}$) moved from the point ($x_i$, $y_j$) in the y-direction by one picture element is judged to be negative, that is, if the code of the edge signal $I_E$ ($x_i$, $y_j$) at a point ($x_i$, $y_j$) is different from the code of the edge signal $I_E$ ($x_i$, $y_{j+1}$) at a point ($x_i$, $y_{j+1}$) moved From the point ($x_i$, $y_j$) in the y-direction by one picture element, the process advances to the step S7, wherein the value of 1 is set in the zero crossing function $P_c$ ($x_i$, $y_j$) as described above, and the process advances to the step S5.

In the step S3, if the product of the edge signal $I_E$ ($x_i$, $y_j$) at the point ($x_i$, $y_j$) and the edge signal $I_E$ ($x_i$, $y_{j+1}$) at the point ($x_i$, $y_{j+1}$) moved from the point ($x_i$, $y_j$) in the y-direction by one picture element is judged not to be negative, the process advances a step S4, wherein it is judged that the zero crossing is not generated between the point ($x_i$, $y_j$) and the point ($x_{i+1}$, $y_j$) or the point ($x_i$, $y_{j+1}$). Thus, the value of 0 which designates no generation of the zero crossing is, for example, set in the zero crossing function $P_c$ ($x_i$, $y_j$), and the process advances to the step S5.

In addition, the processings from the steps 2 to 4, and the step 7 are performed for the point corresponding to each picture element within the face image screen on the xy plane [each point ($x_i$, $y_j$) in the range of $0 \leq x_i \leq N-1$, $0 \leq y_j \leq N-1$).

By calculating the function $P_c$ ($x_i$, $y_j$) of indicating the zero crossing point of the edge of the face image in the manner described above, that is, by detecting the zero crossing point of the edge of the face image, it is possible to remove the effect due to illumination or the like when the face image is photographed by the video camera 1.

The process advances to the step S5, wherein the zero crossing function $P_c$ (x, y) is filtered with a low pass filter such as a Gaussian filter, so that the face image pattern represented by the zero crossing function $P_c$ (x, y) is converted into the so-called faded face image pattern, and the input pattern P (x, y) as the characteristic amount of the face image photographed by the video camera 1 is calculated.

Additionally, in the step S5, the input pattern P (x, y) as the characteristic amount of the face image photographed by the video camera 1 may be acquired by multiplying the frequency characteristic of the zero crossing function $P_c$ (x, y) by the frequency characteristic of the Gaussian filter. However, in this embodiment, the input pattern P (x, y) is acquired by two-dimensionally convoluting the zero crossing function $P_c$ (x, y) with an impulse response $F_G$ (x, y) of the Gaussian filter as shown in the equation of (1-2):

$$F_G(x,y) = \frac{1}{2\pi\sigma^2} \exp\left( -\frac{x^2+y^2}{2\sigma^2} \right) \quad (1-2)$$

In addition, σ is a specified constant set according to the magnitude of the Gaussian filter just as the LOG filter in the step S1.

By the processing in the step S5, the change in the contribution degree $X_i$ of the input pattern P (x, y) to the function $F_i$ (x, y) stored in the function learning storing unit 5, which is detected by a comparing processing unit 4 described later, is made smooth, thus making it possible to easily detect the function $F_{MAX}$ (x, y) of giving the maximum contribution degree $X_{MAX}$.

The input pattern P (x, y) calculated in the step S5 is outputted to the comparing processing unit 4 in the step S6, thus completing the processing.

As described above, the input pattern P (x, y) as the characteristic amount of the face image is prepared on the basis of the face image data I (x, y) in the pre-processing unit 3.

In the comparing processing unit 4, the correlation amount of the input pattern P (x, y) prepared in the pre-processing unit 3, for example, the contribution degree $X_i$ to the function $F_i$ (x, y) (i=1, 2, ..., r: r is a specified number) as the basic pattern stored in the function learning storing unit 5 is calculated, and the maximum contribution degree $X_{MAX}$ as the maximum value is detected.

Here, the contribution degree $X_i$ of the input pattern P (x, y) to the function $F_i$ (x, y) is the orthogonal projection of the input pattern P (x, y) to the function $F_i$ (x, y), which means the inner product of the function $F_i$ (x, y) calculated according to the equation (2-1) and the input pattern P (x, y).

$$X_i = \sum_{y=0}^{N-1} \sum_{x=0}^{N-1} F_i(x,y) P(x,y) \quad (2-1)$$

In addition, as described above, N is the number of the picture elements for each of the vertical and the horizontal directions of the screen in the face image outputted from the video camera 1 to the pre-processing unit 3 through the memory unit 2.

In the comparing processing unit 4, the input pattern P (x, y) outputted from the pre-processing unit 3 is matched with the function $F_{MAX}$ (x, y), of giving the maximum contribution degree $X_{MAX}$ (MAX is a value from 1 to r) for each block, and the deformed amount M (x, y) [M' (x, y)] of the input pattern P (x, y) [function $F_{MAX}$ (x, y)] is calculated in the case that the input pattern P (x, y) [function $F_{MAX}$ (x, y)] is made to be most analogous to the function $F_{MAX}$ (x, y) [input pattern P (x, y)].

Figure 3A:
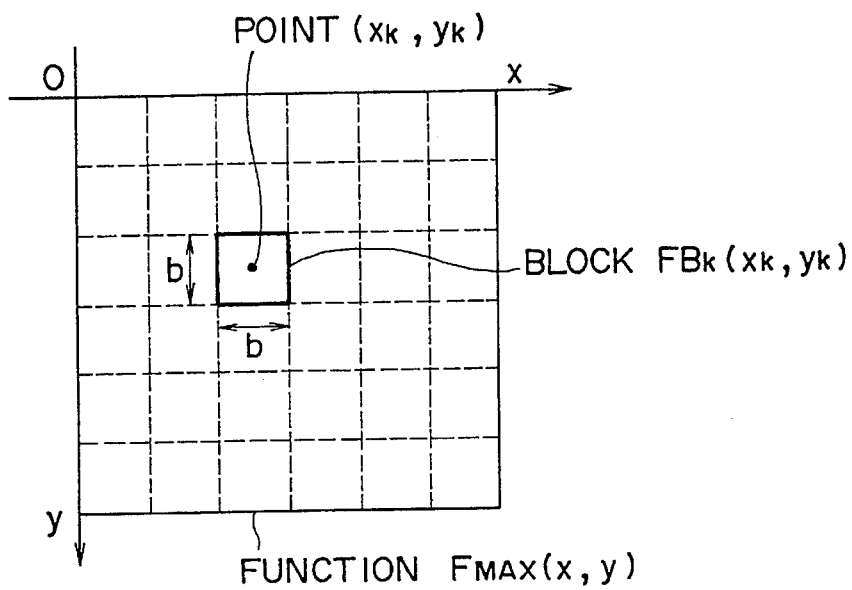
FIGS. 3(*a*) and 3(*b*) are a view for explaining a method for calculating a deformed amount M (x, y) in a comparing processing unit of the embodiment in FIG. 1.
Figure 3B:
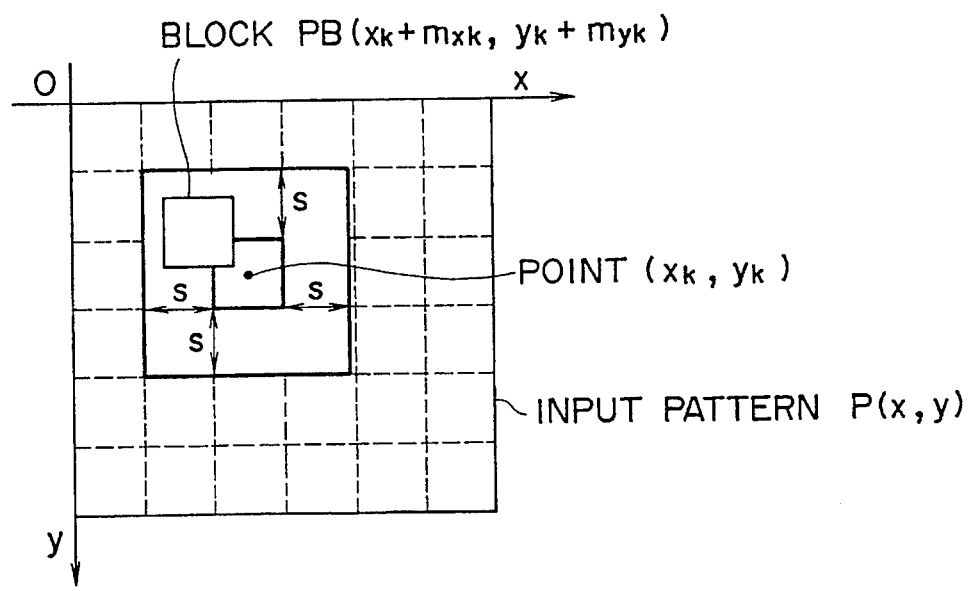

Namely, in the comparing processing unit 4, first, the function $F_{MAX}$ (x, y) is divided into blocks $FB_K$ ($x_K$, $y_K$) (k=0, 1, 2 ..., B−1) in B pieces composed of picture elements in b pieces for each of the vertical and horizontal directions, as shown in FIG. 3a. In addition, the point ($x_k$, $y_k$)

indicates the coordinate point of the center of the block $FB_k$ $(x_k, y_k)$.

Next, blocks PB $(x_i, y_j)$ having the center coordinate point $(x_i, y_j)$, which are composed of the picture elements of b pieces for each of the vertical and horizontal directions, are assumed on the input pattern P (x, y). Thus, the movement amount $(m_{xk}, m_{yk})$ of the block $FB_k$ $(x_k, y_k)$ is detected such that the block $FB_k$ $(x_k, y_k)$ is moved from the center point $(x_k, y_k)$ on the input pattern P (x, y) within the range of ±S picture elements in the x-direction or the y-direction, and is most analogous to the PB $(x_i, y_j)$ on the input pattern P (x, y).

Namely, in the comparing processing unit 4, the deformed amount M (x, y) is calculated (detected) as the movement amount $(m_{xk}, m_{yk})$ with which the contribution ratio $X_{MAX}$ (k) of the block PB $(x_K+m_{xk}, y_K+m_{yk})$ to each block $FB_k$ $(x_k, y_k)$ becomes the maximum value, as shown in the equation (2-2):

$$X_{MAX}(k) = <FB(x_k, y_k), PB(x_k+m_{xk}, y_k+m_{yk})> \quad (2\text{-}2)$$

where <a, b> represents the inner product of the vectors a and b, and accordingly, $$<FB(x_k,y_k), PB(x_K + m_{xk}, y_K + m_{yk})> =$$

$$\sum_{y=[y_k-b/2]}^{y=[y_k+b/2]} \sum_{x=[x_k-b/2]}^{x=[x_k+b/2]} F(x,y), P(x + m_{xk}, y + m_{yk})$$

where [u] is the maximum integer not exceeding the value u.

Hereinafter, in the case that the block $FB_k$ $(x_k, y_k)$ with the center of the point $(x_k, y_k)$ is most analogous to the block PB $(x_i, y_j)$ on the input pattern P (x, y), the movement amount M $(m_{xk}, m_{yk})$ of the block $FB_k$ $(x_k, y_k)$ is represented by a deformed amount M $(x_k, y_k)$, and the set of the deformed amount M $(x_k, y_k)$ is represented by a deformed amount M (x, y).

The deformed amount M (x, y) thus calculated by the comparing processing unit 4 is supplied to the function learning storing unit 5 and the deformed amount analysis unit 6.

In the function learning storing unit 5, by use of the deformed amount M (x, y) calculated by the comparing processing unit 4, the function $F_{MAX}$ (x, y) of giving the maximum contribution degree $X_{MAX}$ detected by the comparing processing unit 4 or the input pattern P (x, y) are deformed. Thus, the function $F_{MAX}$ (x, y) stored therein is regenerated on the basis of the deformed function $F_{MAX}'$ (x, y) and the deformed input pattern P' (x, y) on the xy plane.

Figure 4:
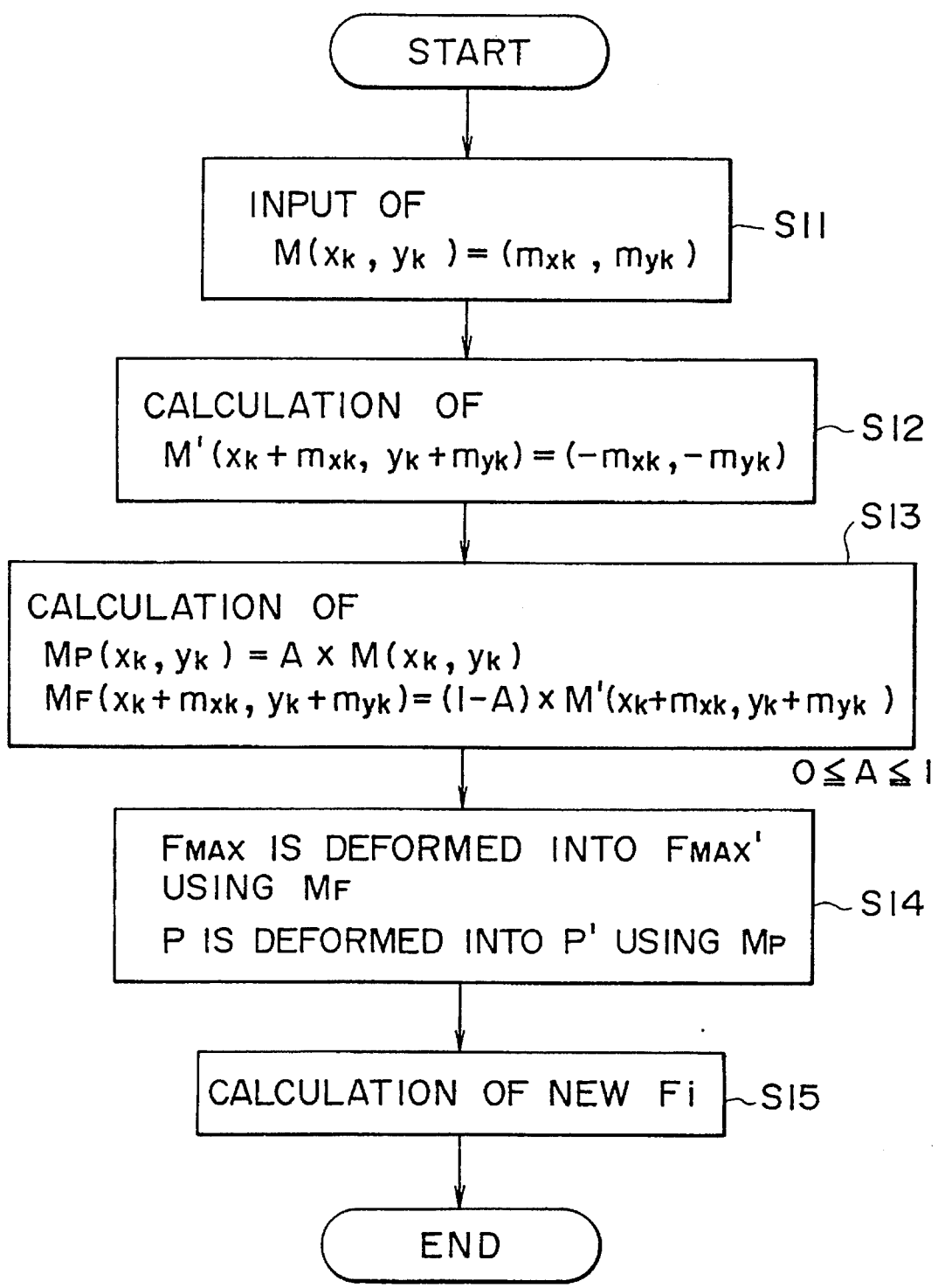
FIG. 4 is a flow chart for explaining the action of a function learning storing unit of the embodiment in FIG. 1.

Namely, in the function learning storing unit 5, as shown in the flow chart of FIG. 4, first, in a step S11, when the deformed amount M (x, y) [M $(x_k, y_k)$ [=set of $(m_{xk}, m_{yk})$] as the set of the movement amount $(m_{xk}, m_{yk})$ of the block $FB_k$ $(x_k, y_k)$ in the case that the block $FB_k$ $(x_k, y_k)$ is most analogous to the block PB $(x_i, y_j)$ on the input pattern P (x, y) is inputted from the comparing processing unit 4, in a step S12, the movement amount $(-m_{xk}, -m_{yk})$ of the block PB $(x_i, y_j)$ [=PB $(x_k+m_{xk}, y_k+m_{yk})$] in the case that the block PB $(x_i, y_j)$ on the input pattern P (x, y) is made most analogous to the block $FB_k$ $(x_k, y_k)$ is calculated, to be set to a variable $M'(x_k+m_{xk}, y_k+m_{yk})$ indicating the movement amount $(-m_{xk}, -m_{yk})$.

The process advances to the step S13, wherein the set $M_P$ (x, y) of a deformation active element $M_P$ $(x_k, y_k)$ for deforming the input pattern P (x, y) or the function $F_{MAX}$ (x, y), and the set $M_F$ (X, Y) of $M_F$ $(x_k+m_{xk}, y_k+m_{yk})$ are respectively calculated according to the following equations, and the process advances to a step S14:

$$M_P(x_k, y_k) = A \times M(x_k, y_k)$$

$$M_F(x_k+m_{xk}, y_k+m_{yk}) = (1-A) \times M'(x_k+m_{xk}, y_k+m_{yk})$$

where A is a constant within the range of $0 \leq A \leq 1$, which is regenerated from the small value to the large value as the learning of the function $F_i$ at the function learning storing unit 5 proceeds.

In the step S14, assuming that the deformation active element $M_P(x, y)$ or $M_F$ (x, y) is $$M_P(x, y) = (d1x, d1y) \text{ or}$$

$$M_F(x, y) = (d2x, d2y),$$

the input pattern P (x, y) or the function $F_{MAX}$ (x, y) is deformed according to the following equation:

$$P'(x, y) = P(x+d1x, y+d1y) \text{ or}$$

$$F_{MAX}'(x, y) = F_{MAX}(x+d2x, y+d2y).$$

Namely, the deformed input pattern P' (x, y) as shown in FIG. 5a, and the deformed function $F_{MAX}'$ (x y) as shown in FIG. 5b are calculated, and the process advances to a step S15.

In the step S15, a new function $F_i$ (x, y) as the function $F_{MAX}$ (x, y) subjected to the learning according to the equation (2-3) is calculated on the basis of the new input pattern P' (x, y) and the new function $F_{Max}'$ (x, y), and which is stored in the function learning storing unit 5 in place of the function $F_{MAX}$ (x, y), thus completing the processing. This new function $F_1$ (x, y) is defined as:

$$F_i(x,y) = \frac{F_{MAX}'(x,y) + \epsilon X_{MAX} P'(x,y)}{F_{MAX}'(x,y) + \epsilon X_{MAX} P'(x,y)} \quad (2\text{-}3)$$

where $\epsilon$ is a specified number within the range of $0 < \epsilon < 1$.

On the other hand, the deformed amount M (x, y) inputted from the comparing processing unit 4 to the deformed amount analysis unit 6 is analyzed thereat. Thus, the components of the image of the person's face photographed by the video camera 1 as the input pattern P (x, y) with respect to the vertical or horizontal deviation on the screen (parallel movement component), the positional deviation due to rotation (rotational movement component) or a component regarding the difference in the magnitude due to an enlargement/reduction ratio of the video camera 1, which are contained in the deformed amount M (x, y), are removed. Thus, a new deformed amount Mtdr (x, y) is outputted to the person's information learning storing unit 7.

Figure 6:
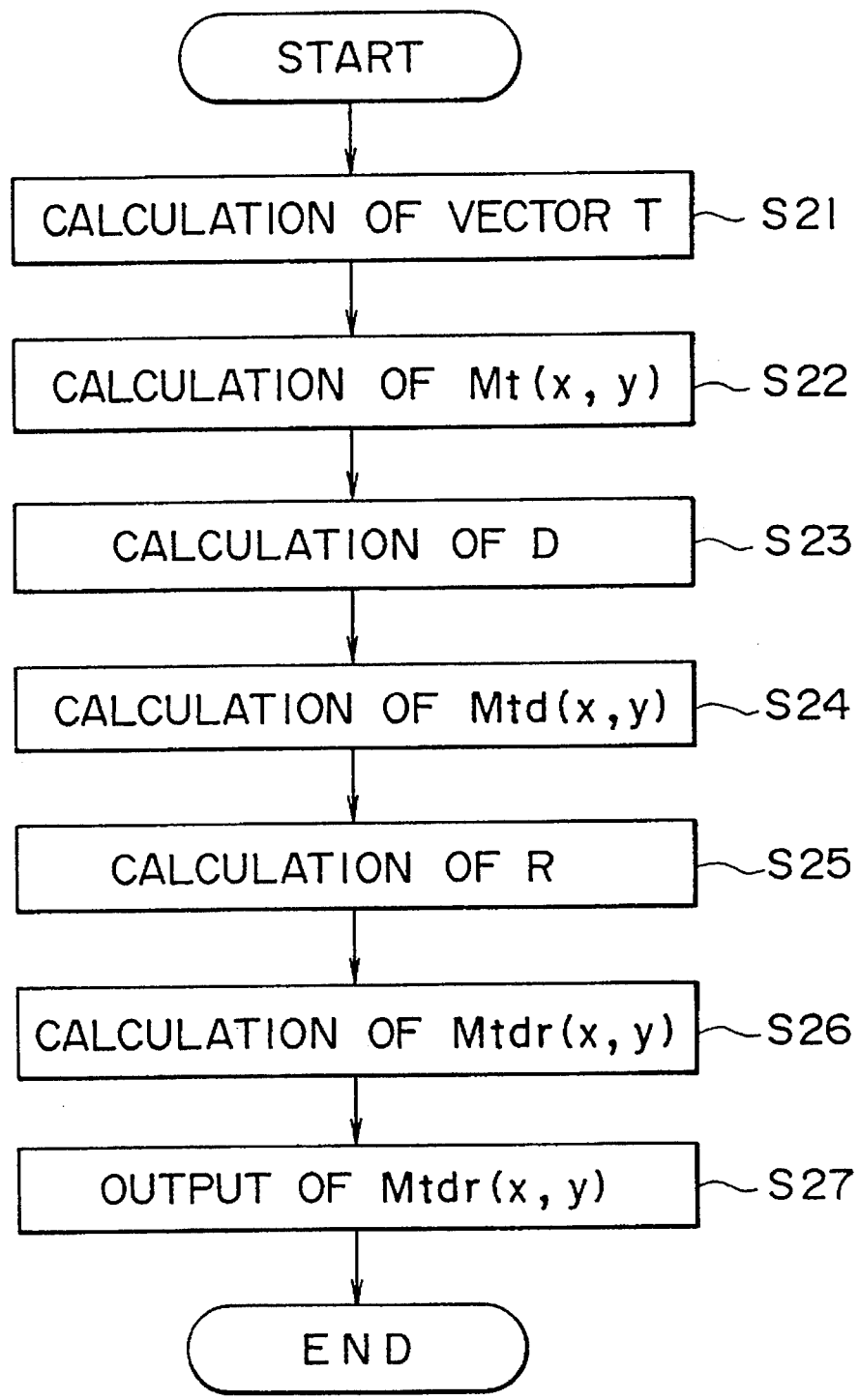
FIG. 6 is a flow chart for explaining the action of a deformed amount analysis unit of the embodiment in FIG. 1.

Namely, in the deformed amount analysis unit 6, as shown in the flow chart of FIG. 6, first, in a step 21, the parallel movement component T contained in the input pattern P (x, y) is calculated by the following equation:

$$T = (T_x, T_y) \quad (3\text{-}1)$$

$$= \frac{1}{N^2} \sum_{y=0}^{N-1} \sum_{x=0}^{N-1} M(x,y)$$

Thus, the process advances to a step 22, wherein a deformed amount Mt (x, y) from which the parallel movement component T is removed is calculated on the basis of the deformed amount M (x, y) according to the following equation, and the process advances to a step S23.

$$Mt(x, y) = M(x, y) - T \quad (3\text{-}2)$$

In the step S23, wherein the component D regarding the difference in the magnitude contained in the input pattern P (x, y) (component regarding the enlargement/reduction ratio) is calculated according to the following equation:

$$D = \sum_{y=0}^{N-1} \sum_{x=0}^{N-1} <M(x,y), r(x,y)> \quad (3\text{-}3)$$

where $r(x, y)=(x-x0, y-y0)$, and $(x0, y0)$ is the center of the face image, that is, $(x0, y0)=(N/2, N/2)$.

After that, the process advances to a step S24, wherein a deformed amount Mtd (x, y) obtained by removing the component D regarding the enlargement/reduction ratio from the deformed amount Mt (x, y) is calculated according to the following equation:

$$Mtd\ (x,\ y)=Mt\ (x,\ y)+\delta Md\ (x,\ y) \quad (3\text{-}4)$$

where $\delta Md\ (x, y)$ is defined by the following equation:

$$\delta Md(x,y) = \left[-D / \left(\sum_{y=0}^{N-1}\sum_{x=0}^{N-1}\{(x-x_o)^2+(y-y_o)^2\}\right)\right] r(x,y)$$

Assuming that $\delta Md\ (x, y)$ is represented by the following equation:

$$\delta Md\ (x,\ y)=\alpha r\ (x,\ y)$$

($\alpha$ is the number within the range of $0 \leq \alpha \leq 1$), $\delta Md\ (x, y)$ is required, by replacing the M (x, y) in th equation (3-3) with $[M\ (x, y)+\delta Md\ (x, y)]$ such that the component D regarding the enlargement/reduction ratio becomes zero, and by replacing the component D regarding the enlargement/reduction ratio with zero.

In a step S25, the rotational movement component (tilting component) R contained in the input pattern P (x, y) is calculated by the following equation:

$$R = \sum_{y=0}^{N-1}\sum_{x=0}^{N-1} M(x,y) \times r(x,y) \quad (3\text{-}5)$$

where $M\ (x, y) \times r\ (x, y)$ indicates the outer product of the vector M (x, y) and the vector r (x, y).

The process advances to a step S26, wherein a deformed amount Mtdr (x, y) obtained by removing the rotational movement component R from the deformed amount Mtd (x, y) is calculated by the following equation, and the process advances to the step S27.

$$Mtdr\ (x,\ y)=Mtd\ (x,\ y)+\delta Mr\ (x,\ y) \quad (3\text{-}6)$$

where $\delta Mr\ (x, y)$ is defined by the following equation:

$$\delta Mr(x,y) = \left[-R / \left(\sum_{y=0}^{N-1}\sum_{x=0}^{N-1}\{(x-x_o)^2+(y-y_o)^2\}\right)\right] s(x,y)$$

where $s\ (x, y)=[-(y-y0), x-x0]$.

Assuming that $\delta Mr\ (x, y)$ may be represented by the following equation:

$$\delta Mr\ (x,\ y)=\alpha s\ (x,\ y),$$

$\delta Mr\ (x, y)$ is required by replacing the M (x, y) in th equation (3-5) with $[M\ (x, y)+\delta Mr\ (x, y)]$ such that the rotational movement R becomes zero, and by replacing the rotational movement component R with zero.

As described above, the new deformed amount Mtdr (x, y), from which the parallel movement component T, the component D regarding the enlargement/reduction ratio, and the rotational movement component R are removed, is outputted to the person's information learning storing unit 7 in a step S27, thus completing the processing.

The above processing is made for each deformed amount M $(x_k, y_k)$ (k=0, 1, ... B−1) to each of blocks divided in B pieces in the function $F_i$ (x, y) in the comparing processing unit 4 as the constituting element of the deformed amount M (x, y).

Accordingly, in the deformed amount analysis unit 6, the new deformed amount Mtdr $(x_k, y_k)$ to the deformed amount M $(x_k, y_k)$ of each of blocks k (k=0, 1, ... B−1) divided in B pieces in the function $F_i$ (x, y) ($F_{MAX}$ (x, y)) in the comparing processing unit 4 is calculated.

Namely, in this specification, the set of the new deformed amount Mtdr $(x_k, y_k)$ to the deformed amount M $(x_k, y_k)$ of each of blocks k divided in B pieces in the function $F_i$ (x, y) [$F_{MAX}$ (x, y)] in the comparing processing unit 4 is described as the new deformed amount Mtdr (x, y).

Further, since the deformed amount Mtdr $(x_k, y_k)$ is the two-dimensional vector, the new deformed amount Mtdr (x, y) as the set of the deformed amount Mtdr $(x_k, y_k)$ may be regarded as the 2B-dimensional vector.

As the processing in the deformed amount analysis unit 6 is completed, in the person's information learning storing unit 7, the new deformed amount Mtdr (x, y) calculated by the deformed amount analysis unit 6 is stored in the memory contained therein, in correspondence to the person's information (standard pattern) K (t) being the function of the number t (t=1, 2 ... , T: where T is the number of the person's face images) given to the person as the recognition result.

Figure 7:
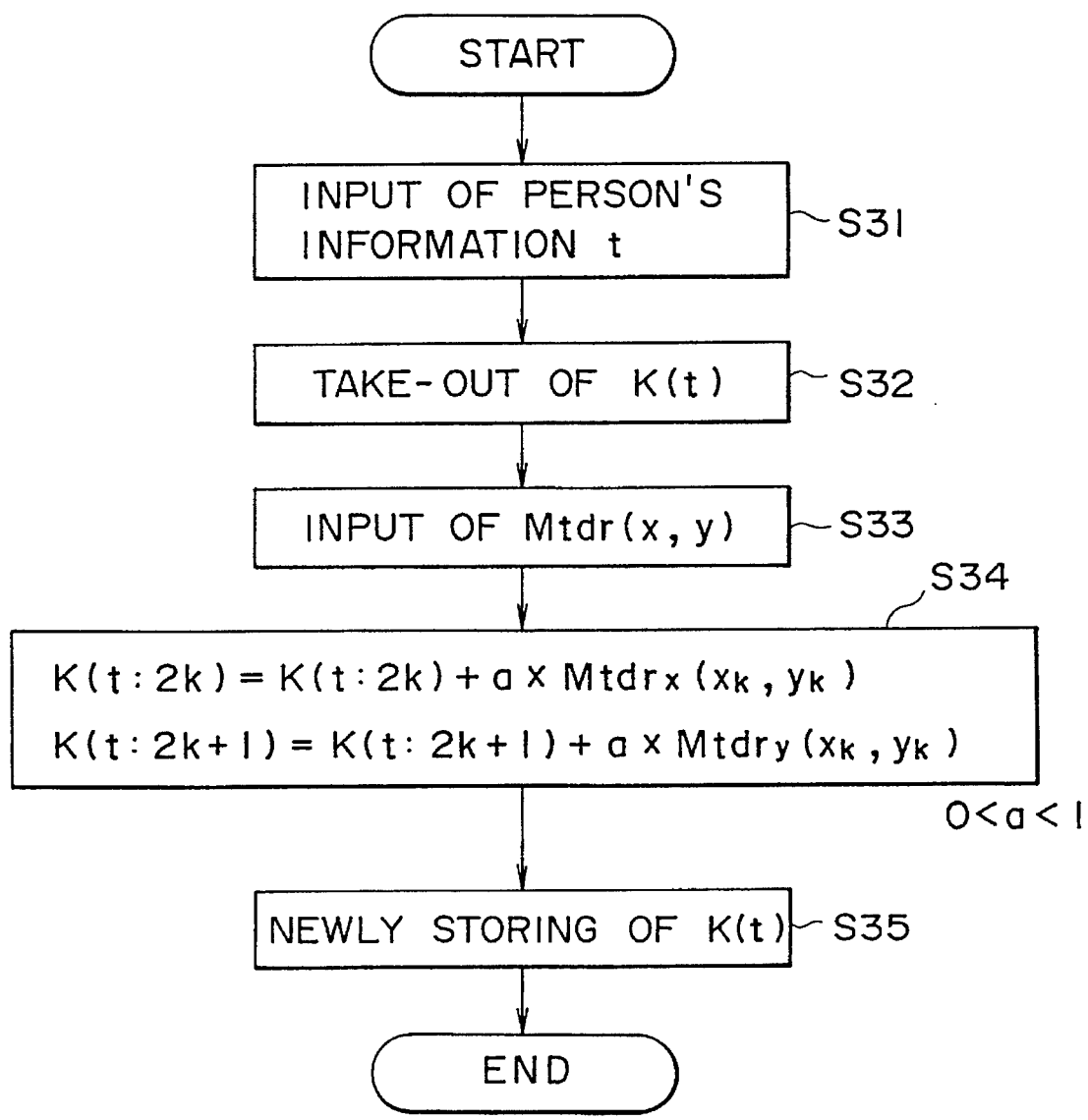
FIG. 7 is a flow chart for explaining the action of a person's information learning storing unit of the embodiment in FIG. 1.
Figure 8:
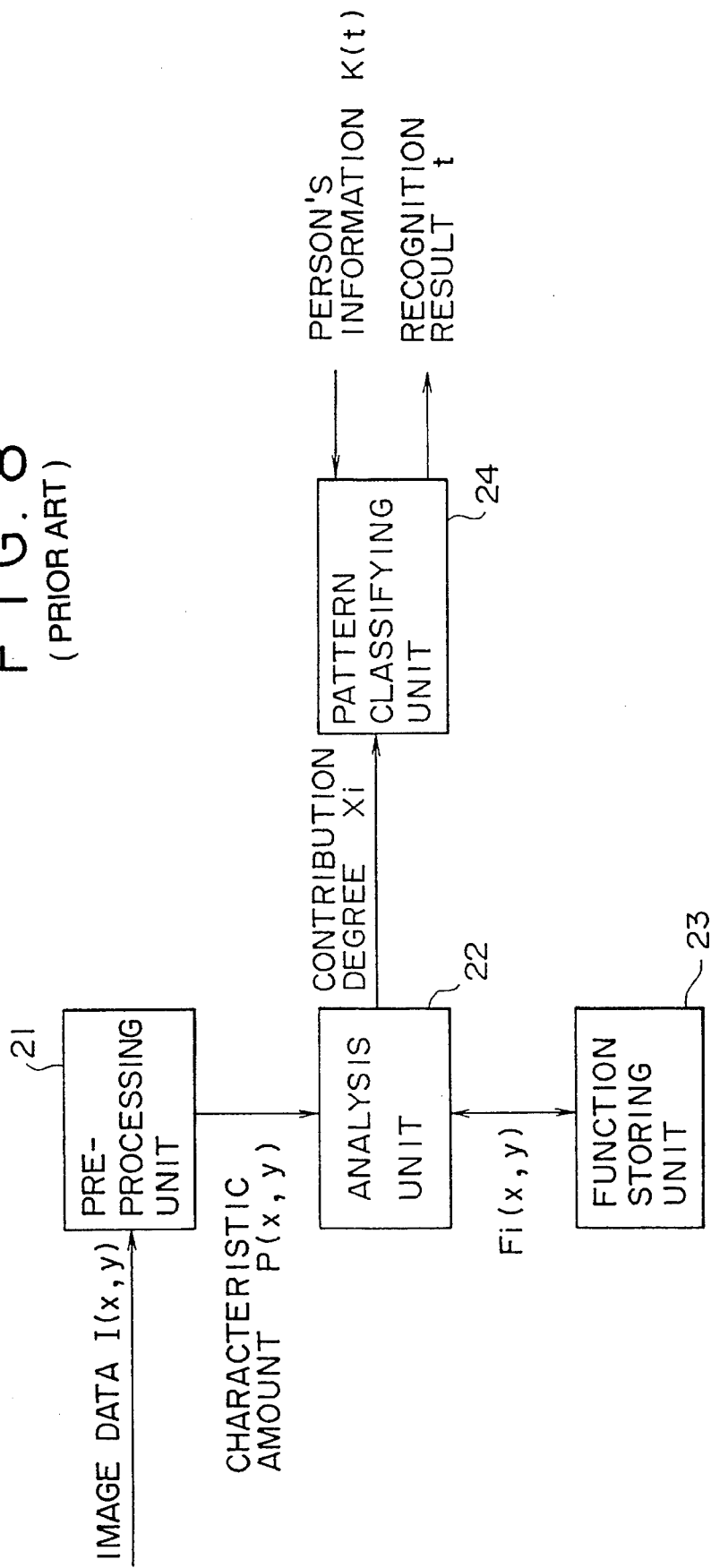
FIG. 8 is a block diagram showing the construction of one example of prior art image recognition devices.
Figure 9:
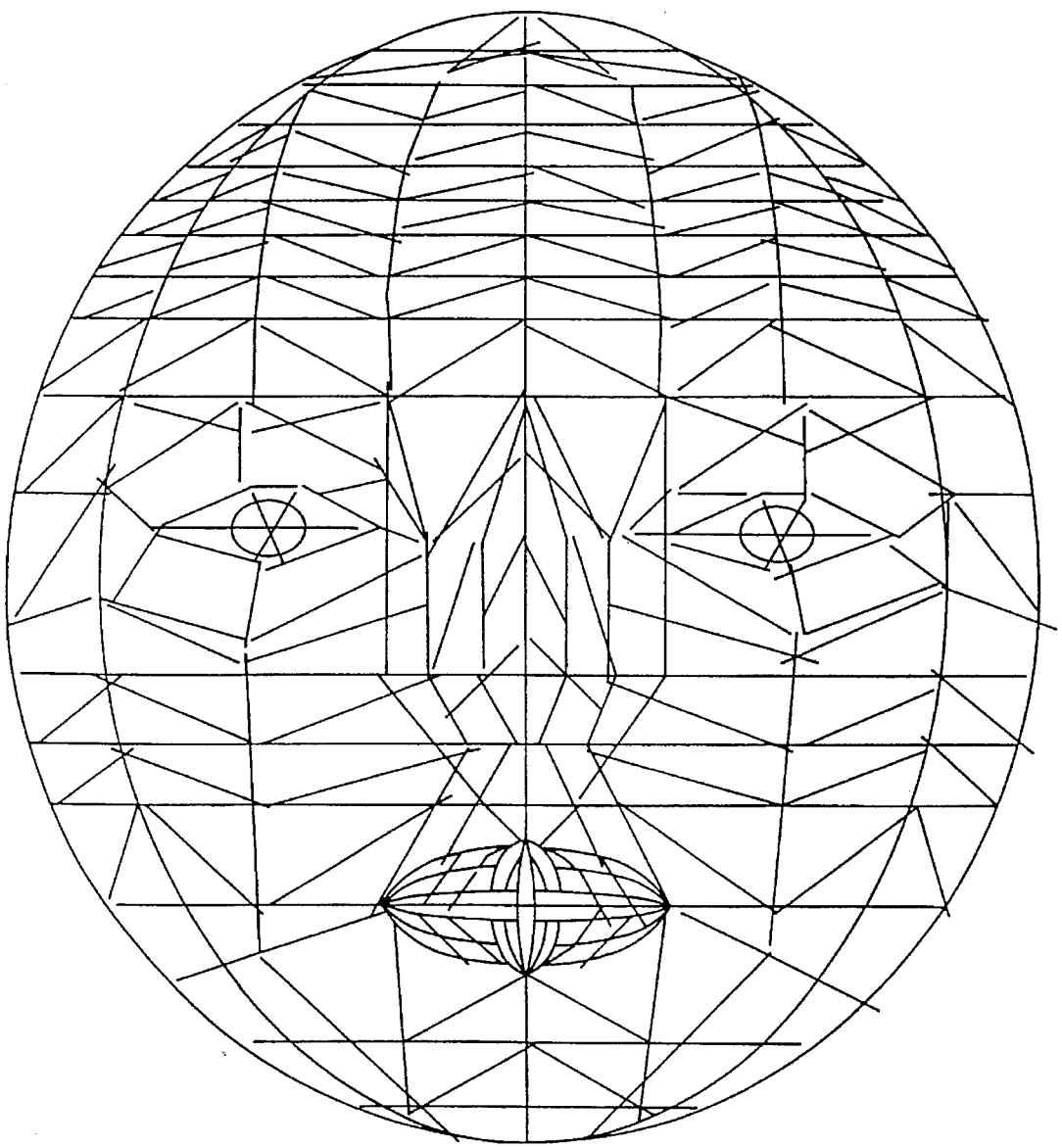
FIG. 9 is a view showing a wire frame model.
Figure 10A:
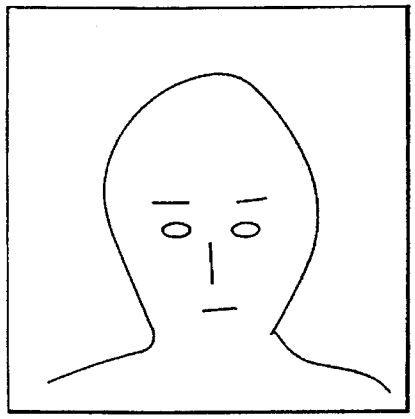
FIGS. 10(*a*) to 10(*d*) are views for explaining a method recognizing the person's face by Model-Based Coding.
Figure 10B:
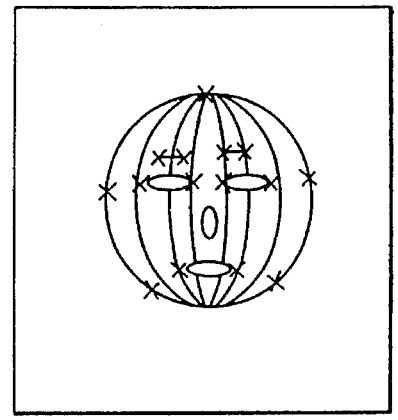
Figure 10C:
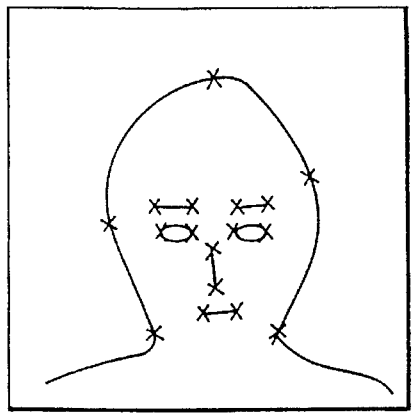
Figure 10D:
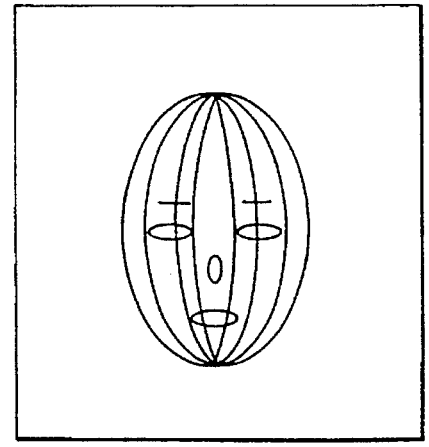

Namely, in the person's information learning storing unit 7, as shown in the flow chart of FIG. 7, first, in a step S31, when the number t given to the person is inputted, the person's information K (t) as the standard pattern is read out from the memory contained in the person's information learning storing unit 7 in a step S32, and the process advances to a step S33.

In the step S33, as the deformed amount Mtdr (x, y) is inputted from the deformed amount analysis unit 6 to the person's information learning unit 7, in a step S34, the person's information K (t) is regenerated on the basis of the deformed amount Mtdr (x, y) according to the following equation:

$$K\ (t{:}2k)=K\ (t{:}2k)+a \times Mtdr_x\ (x_k,\ y_k)$$

$$K\ (t{:}2k+1)=K\ (t{:}2k+1)+a \times Mtdr_y\ (x_k,\ y_k)$$

where k=0, 1, ... , B−1.

Here, $Mtdr_x\ (x_k, y_k)$ or $Mtdr_y\ (x_k, y_k)$ indicate the x-component or the y-component on the xy plane of the new deformed amount Mtdr $(x_k, y_k)$ in the block (FIG. 3a) of the function $F_i$ (x, y) with the center of the point $(x_k, y_k)$.

Further, since the new deformed amount Mtdr (x, y) is the 2B-dimensional vector as described above, the person's information K (t) is the 2B-dimensional vector similarly. The K (t:2k) and K (t:2k+1) indicate the 2k-dimensional and the (2k+1)-dimensional elements of the person's information K (t), respectively.

In addition, a is a specified constant within the range of 0<a<1.

The process advances to a step S35, wherein the K(t) regenerated in the step S34 is stored in the memory contained in the person's information learning storing unit 7, thus completing the processing.

Next, when the device is in the recognition mode, in the video camera 1, the memory unit 2, the pre-processing unit 3, the comparing processing unit 4, the function learning storing unit 5, or the deformed amount analysis unit 6, the same processing as described above is made, and the new deformed amount Mtdr (x, y) is inputted in the person's information learning storing unit 7. Accordingly, in the person's information learning storing unit 7, the Euclidean distance between the deformed amount Mtdr (x, y) and certain person's information K (t) stored in the memory contained therein is calculated, and the number t in the person's information K(t) of minimizing the distances is outputted as the recognition result.

In this embodiment, the pre-processing unit 3 filters the image data with the LOG filter to detect the image edge; however, the detection method for the image edge is not limited thereto. Further, in the pre-processing unit 3, it is possible to take out not only the image edge but also the other characteristic amount. In addition, since the problem of correspondence to the image is solved at the comparing processing unit 4, at the pro-processing unit 3, it is possible to output the image data to the comparing processing unit 4 without any filtering.

In the comparing processing unit 4, the deformed amount M (x, y) is calculated by the block matching; however, the deformed amount M (x, y) can be calculated by the optical flow method commonly used in detection of the movement of the movable image as disclosed in, for example, Japanese Patent Laid-open No. HEI 3-150520.

In the function learning storing unit 5, only the function $F_{MAX}$ (x, y) of giving the maximum contribution degree $X_{MAX}$ is deformed (learned); however, the function of giving the secondarily or thirdly larger contribution degree may be deformed (learned).

The person's information learning storing unit 7 may be constituted of the neural network just as the function learning storing unit 5, wherein the contribution degree $X_i$ calculated in the comparing processing unit 4 is inputted in the person's information learning storing unit 7 (as shown in the dotted line of FIG. 1), so that the person's information K (t) can be learned according to the error inverse propagation method by use of the deformed amount Mtdr (x, y) and the contribution degree $X_i$, that is, the weightening factor of the neural network can be regenerated. Also, by inputting the parallel movement component T, the component regarding the enlargement/reduction ratio or the rotational movement component R calculated by the deformed amount analysis unit 6 in the person's information learning storing unit 7, it is possible to perform the learning of the person's information K (t). Thus, it is possible to judge the position, magnitude or the tilting of the substance (image) to be recognized.

In the person's information learning storing unit 7, it is possible to perform the learning by the so-called main component analysis method.

Further, in the function learning storing unit 5, or the person's learning storing unit 7, there may used, for example, the learning methods using the so-called Boltzmann machine and the simulated annealing.

As described above, according to the pattern recognition device of the present invention, an input pattern from the information of the image is prepared, and is compared with the basic pattern stored in the basic pattern storing means and calculates the deformed amount of the input pattern to the basic pattern. Subsequently, on the basis of the deformed amount, the basic pattern stored in the basic pattern storing means and the input pattern prepared by the preparing means are deformed. Thus, on the basis of the deformed basic pattern and the input pattern, the basic pattern stored in the basic pattern storing menas is regenerated. Accordingly, since the basic pattern is regenerated so as to be analogous to the input pattern, it is unnecessary to prepare the basic pattern for each recognition object, thus making it possible to reduce the storing capacity of the basic pattern storing means for the storing the basic pattern, and hence to make smaller the size of the device. Further, it is possible to improve the recognition ratio.

Further, according to the pattern recognition device of the present invention, the input pattern is compared with the basic pattern stored in the basic pattern storing means, so that the deformed amount of the input pattern to the basic pattern is calculated. Then, the deformed amount is analyzed, and on the basis of the result, the standard pattern stored in the standard pattern storing means is regenerated. Accordingly, it is possible to automatically perform the regeneration (learning) of the standard pattern so as to improve the recognition ratio.

What is claimed is:

1. A pattern recognition device comprising:

a basic pattern storing means for storing a basic pattern;

a standard pattern storing means for storing a standard pattern;

a preparing means for preparing an input pattern on the basis of inputted information;

a comparing means for comparing the input pattern prepared by the preparing means with the basic pattern stored in the basic pattern storing means, and calculating at least a deformed amount of the input pattern to the basic pattern and a correlation amount;

an analyzing means for analyzing the deformed amount calculated by the comparing means and generating an analysis result; and a standard pattern regenerating means for regenerating a standard pattern stored in the standard pattern storing means as a function of at least the analysis result from the analyzing means and the correlation amount calculated by the comparing means.

2. A pattern recognition means according to claim 1, wherein the preparing means filters the inputted information with a Laplacean of Gaussian (LOG) filter, to detect a zero crossing point, and filters the inputted information with a low pass filter.

3. A pattern recognition device according to claim 1, wherein the basic pattern is divided into a series of blocks and the comparing means matches the input pattern with the basic pattern for each block, and calculates a movement amount of each block as the deformed amount.

4. A pattern recognition device according to claim 1, wherein the preparing means prepares the input pattern as a function of a face image.

5. A pattern recognition device according to claim 1, wherein the preparing means prepare an input pattern on the basis of inputted video image information of a particular person's face, the basic pattern storing means stores image data of a human face as a basic pattern, and the standard pattern storing means stores visual image identification data as a standard pattern.

6. A pattern recognition device according to claim 5, wherein the standard pattern is obtained from a plurality of visual images from the same person.

* * * * *